US010401190B2

(12) United States Patent
Zhang

(10) Patent No.: US 10,401,190 B2
(45) Date of Patent: Sep. 3, 2019

(54) VEHICLE CONTROL METHOD AND APPARATUS, AND STORAGE MEDIUM

(71) Applicant: Beijing Xiaomi Mobile Software Co., Ltd., Beijing (CN)

(72) Inventor: Xu Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 98 days.

(21) Appl. No.: 15/432,822

(22) Filed: Feb. 14, 2017

(65) Prior Publication Data

US 2017/0292854 A1 Oct. 12, 2017

(30) Foreign Application Priority Data

Apr. 6, 2016 (CN) .......................... 2016 1 0210598

(51) Int. Cl.
*G08G 1/14* (2006.01)
*G01C 21/36* (2006.01)
(Continued)

(52) U.S. Cl.
CPC ..... *G01C 21/3685* (2013.01); *G01C 21/3415* (2013.01); *G05D 1/0088* (2013.01);
(Continued)

(58) Field of Classification Search
CPC ............ G01C 21/3685; G01C 21/3415; G05D 1/0088; G08G 1/143; G08G 1/146; G08G 1/147
See application file for complete search history.

(56) References Cited

U.S. PATENT DOCUMENTS 7,026,954 B2 * 4/2006 Slemmer .................. G08G 1/14
340/932.2
7,688,225 B1 * 3/2010 Haynes .................... G08G 1/14
340/932.2
(Continued)

FOREIGN PATENT DOCUMENTS

CN 101783079 A 7/2010
CN 103441911 A 12/2013
(Continued)

OTHER PUBLICATIONS

Extended European Search Report issued in European Application No. 17152281.6, mailed from the European Patent Office, dated Jul. 24, 2017.
(Continued)

*Primary Examiner* — Peter D Nolan
(74) *Attorney, Agent, or Firm* — Finnegan, Henderson, Farabow, Garrett & Dunner LLP

(57) ABSTRACT

A vehicle control method includes: acquiring position information and trip information of at least one vehicle including a first vehicle which has entered or is to enter a parking state, the trip information including at least one of: a real-time navigation route, a scheduled departure time, or a scheduled navigation route; determining a first parking space for the first vehicle based on the position information and the trip information of the at least one vehicle; and transmitting a first instruction including information about the first parking space to the first vehicle to cause the first vehicle to move into the first parking space.

17 Claims, 16 Drawing Sheets

(51) Int. Cl.
*G01C 21/34* (2006.01)
*G05D 1/00* (2006.01)
*H04W 4/021* (2018.01)

(52) U.S. Cl.
CPC ............. *G08G 1/143* (2013.01); *G08G 1/146* (2013.01); *G08G 1/147* (2013.01); *H04W 4/021* (2013.01)

(56) References Cited

U.S. PATENT DOCUMENTS

| | | | | |
|---|---|---|---|---|
| 9,139,199 B2* | 9/2015 | Harvey | .................... | E04H 6/422 |
| 9,298,186 B2* | 3/2016 | Harvey | .............. | B62D 15/0285 |
| 9,299,257 B2* | 3/2016 | Beaurepaire | ........... | G08G 1/143 |
| 9,443,430 B2* | 9/2016 | Beaurepaire | ........... | G08G 1/162 |
| 9,645,578 B2* | 5/2017 | Harvey | .............. | B62D 15/0285 |
| 2002/0171562 A1* | 11/2002 | Muraki | .................... | G08G 1/14 |
| | | | | 340/932.2 |
| 2004/0252034 A1* | 12/2004 | Slemmer | .................. | G08G 1/14 |
| | | | | 340/932.2 |
| 2005/0207876 A1* | 9/2005 | Springwater | ............. | E04H 6/24 |
| | | | | 414/231 |
| 2006/0170566 A1* | 8/2006 | Slemmer | .................. | G08G 1/14 |
| | | | | 340/932.2 |
| 2006/0228197 A1* | 10/2006 | Springwater | ............. | E04H 6/24 |
| | | | | 414/231 |
| 2010/0156672 A1* | 6/2010 | Yoo | .......................... | G08G 1/14 |
| | | | | 340/932.2 |
| 2014/0019174 A1* | 1/2014 | Bhatt | .................... | G06Q 10/02 |
| | | | | 705/5 |
| 2014/0201646 A1 | 7/2014 | Scherpa et al. | | |
| 2014/0302875 A1* | 10/2014 | Beaurepaire | ........... | G08G 1/143 |
| | | | | 455/456.3 |
| 2014/0350855 A1* | 11/2014 | Vishnuvajhala | ....... | G06Q 50/10 |
| | | | | 701/538 |
| 2015/0070196 A1* | 3/2015 | Beaurepaire | ........... | G08G 1/162 |
| | | | | 340/932.2 |
| 2015/0149022 A1* | 5/2015 | Harvey | .................... | E04H 6/422 |
| | | | | 701/23 |
| 2015/0346727 A1 | 12/2015 | Ramanujam | | |
| 2015/0370255 A1* | 12/2015 | Harvey | .............. | B62D 15/0285 |
| | | | | 701/24 |
| 2016/0224028 A1* | 8/2016 | Harvey | .............. | B62D 15/0285 |
| 2017/0038777 A1* | 2/2017 | Harvey | ................ | G05D 1/0088 |
| 2017/0061508 A1* | 3/2017 | Sen | .................... | G06Q 30/0284 |
| 2017/0200320 A1* | 7/2017 | Tomer | .................... | G08G 1/144 |
| 2018/0074513 A9* | 3/2018 | Harvey | ................ | G05D 1/0297 |

FOREIGN PATENT DOCUMENTS

| | | |
|---|---|---|
| CN | 104680835 A | 6/2015 |
| CN | 104918325 A | 9/2015 |
| CN | 105280015 A | 1/2016 |
| CN | 204990734 U | 1/2016 |
| CN | 105453156 A | 3/2016 |
| CN | 105869098 A | 8/2016 |
| DE | 102015007531 B3 | 9/2016 |
| JP | 2013-123922 A | 6/2013 |
| TW | 201537508 A | 10/2015 |
| WO | WO 2015/003899 A1 | 1/2015 |
| WO | WO 2015/114592 A1 | 8/2015 |

OTHER PUBLICATIONS

International Search Report for International Application No. PCT/CN2016/097009, dated Dec. 16, 2016 (12 pages).

\* cited by examiner

1400

VEHICLE CONTROL METHOD AND APPARATUS, AND STORAGE MEDIUM

CROSS-REFERENCE TO RELATED APPLICATION

This application is based on and claims the priority of Chinese Application No. 201610210598.6, filed on Apr. 6, 2016, which is incorporated herein by reference in its entirety.

TECHNICAL FIELD

The present disclosure is generally related to the technical field of automatic control, and more particularly, to a vehicle control method and apparatus, and a storage medium.

BACKGROUND

With the development of technologies and the improvement of living standards, cars usage increases. As a result, it becomes more difficult for drivers to find parking spaces, and more drivers double park their vehicles, or park their vehicles at inappropriate spots, which can block other vehicles and create traffic congestion.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one aspect, a vehicle control method is provided. The method comprises: acquiring position information and trip information of at least one vehicle including a first vehicle which has entered or is to enter a parking state, the trip information including at least one of: a real-time navigation route, a scheduled departure time, or a scheduled navigation route; determining a first parking space for the first vehicle based on the position information and the trip information of the at least one vehicle; and transmitting a first instruction including information about the first parking space to the first vehicle to cause the first vehicle to move into the first parking space.

In another aspect, a vehicle control apparatus is provided. The apparatus comprises a processor; and a memory configured to store instructions executable by the processor, wherein the processor is configured to: acquire position information and trip information of at least one vehicle including a first vehicle which has entered or is to enter a parking state, the trip information including at least one of: a real-time navigation route, a scheduled departure time, or a scheduled navigation route; determine a first parking space for the first vehicle based on the position information and the trip information of the at least one vehicle; and transmit a first instruction including information about the first parking space to the first vehicle to cause the first vehicle to move into the first parking space.

In another aspect, a non-transitory computer-readable storage medium is provided. The storage medium stores instructions that, when executed by a processor of a mobile terminal, cause the mobile terminal to perform a vehicle control method, the method comprising: acquiring position information and trip information of at least one vehicle including a first vehicle which has entered or is to enter a parking state, the trip information including at least one of: a real-time navigation route, a scheduled departure time, or a scheduled navigation route; determining a first parking space for the first vehicle based on the position information and the trip information of the at least one vehicle; and transmitting a first instruction including information about the first parking space to the first vehicle to cause the first vehicle to move into the first parking space.

It should be understood that both the foregoing general description and the following detailed description are only exemplary and explanatory and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

The above drawings illustrate specific embodiments of this disclosure, which will be described in detail in the following. These drawings and literal descriptions are not intended to limit the scope of the concept of this disclosure by any means, but to explain the concept of this disclosure to those skilled in the art with reference to the specific embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
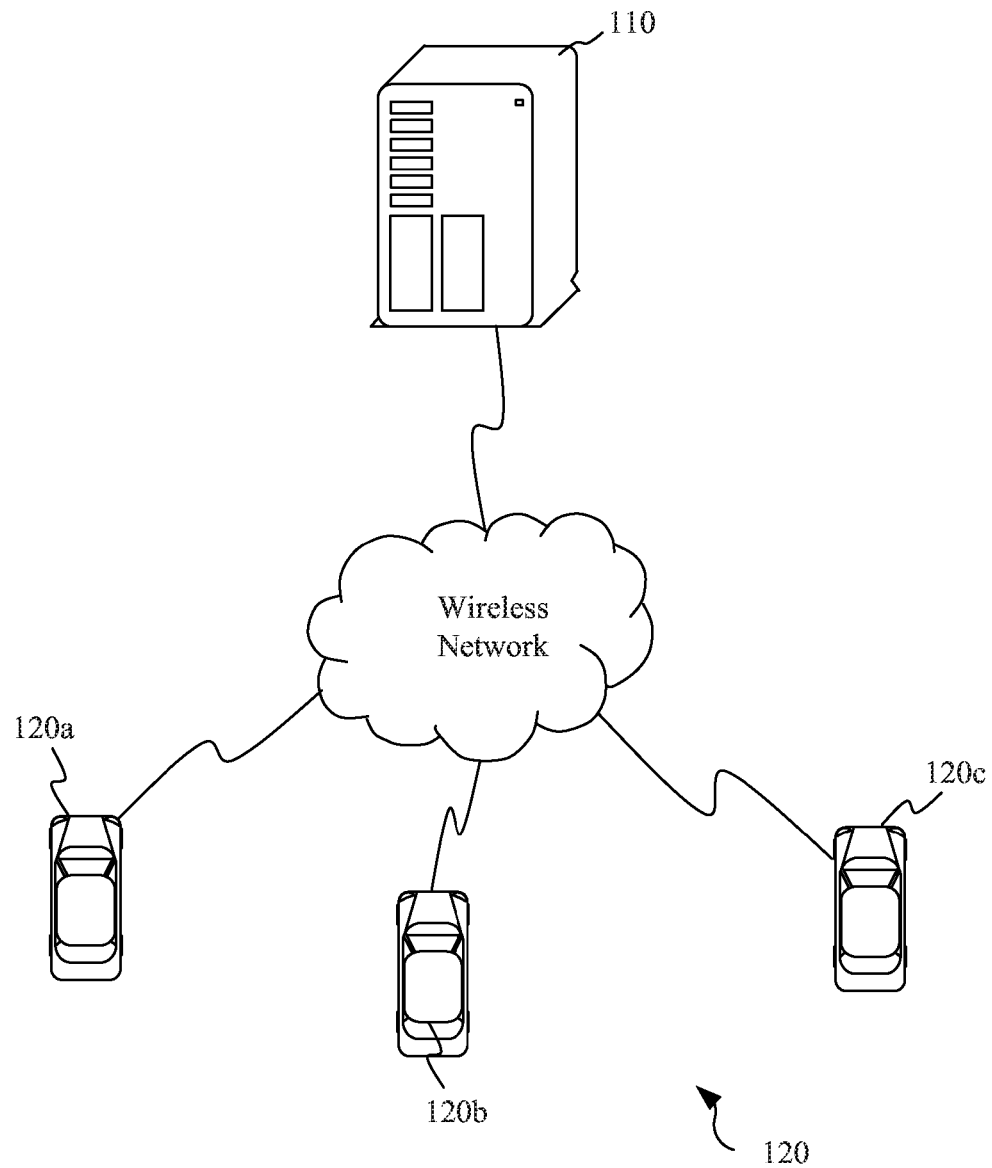
FIG. 1 is a schematic diagram of an exemplary vehicle control system according to embodiments of the present disclosure.

FIG. 1 is a schematic diagram of an exemplary vehicle control system 100 according to embodiments of the present disclosure. In some embodiments, the vehicle control system 100 may include a computer system 110 and at least one vehicle 120. The at least one vehicle 120 may comprise vehicles 120a, 120b, and 120c.

The computer system 110 may be a server, a personal computer, a mobile terminal, etc. The computer system 100 can also include a standalone system, or a cluster composed of multiple computer systems for realizing different functions respectively. The computer system 110 may also be a cloud computing center.

The at least one vehicle 120 may be a vehicle that possesses a positioning function and an automatic driving function. For example, the at least one vehicle 120 may be a vehicle provided with a satellite positioning module or a wireless positioning module and with an automatic driving system.

The at least one vehicle 120 may further have a wireless communication function. For example, the at least one vehicle 120 may include a wireless communication module supporting 3G/4G wireless communication technologies, through which wireless data exchange may be performed between the at least one vehicle 120 and the computer system 110.

Figure 2:
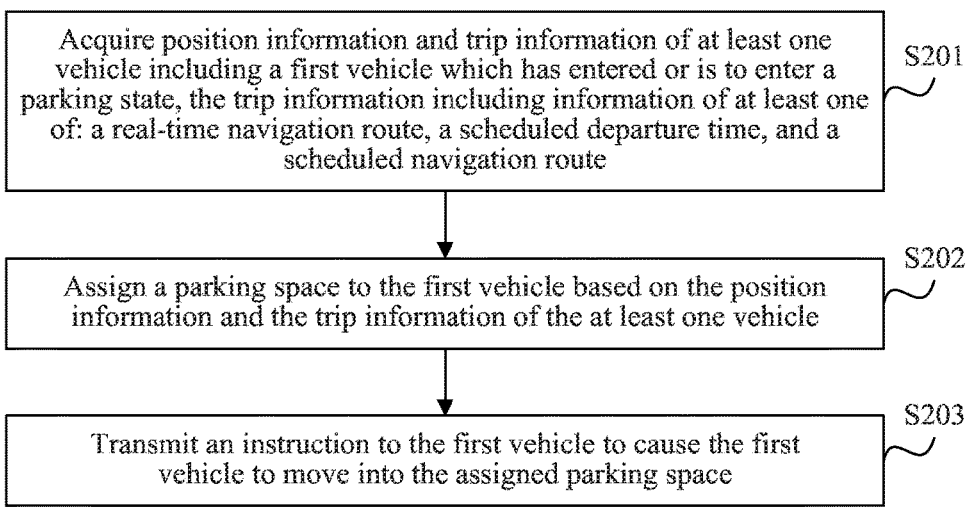
FIG. 2 is a flow chart illustrating an exemplary vehicle control method according embodiments of the present disclosure.

FIG. 2 is a flow chart illustrating an exemplary vehicle control method 200 according embodiments of the present disclosure. The method 200 may be performed by the computer system 110 of FIG. 1, and may comprise the following steps S201-S203.

In step S201, the computer system 110 may acquire position information and trip information of at least one vehicle (e.g., at least one vehicle 120 of FIG. 1) including a first vehicle (e.g., the vehicle 120a of FIG. 1) which has entered or is about to enter a parking state. The first vehicle may be not under the control of a driver. The trip information may include information of at least one of: a real-time navigation route, a scheduled departure time, and a scheduled navigation route.

In step S202, the computer system 110 assigns a parking space to the first vehicle based on the position information and the trip information of the at least one vehicle.

In step S203, the computer system 110 transmits an instruction to the first vehicle to cause the first vehicle to move into the assigned parking space.

Figure 3:
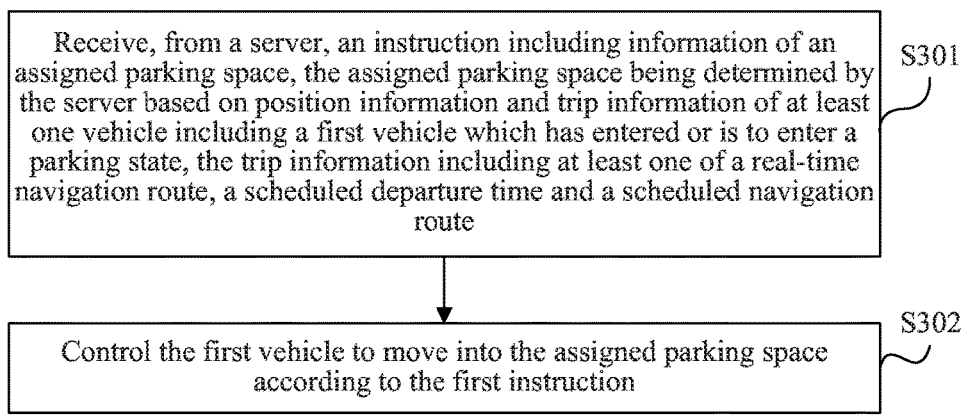
FIG. 3 is a flow chart illustrating an exemplary vehicle control method according to embodiments of the present disclosure.

FIG. 3 is a flow chart illustrating an exemplary vehicle control method 300 according to embodiments of the present disclosure. The method may be performed by one of the at least one vehicle 120 of FIG. 1 (e.g., the vehicle 120a), and may comprise the following steps S301 and S302.

In step S301, the vehicle 120a receives an instruction including information of an assigned parking space from a computer system (e.g., the computer system 110 of FIG. 1), the assigned parking space being determined by the computer system based on position information and trip information of at least one vehicle 120 including the vehicle 120a which has entered or is to enter a parking state. The vehicle 120a may be not under the control of a driver, and the trip information may include information of at least one of: a real-time navigation route, a scheduled departure time, and a scheduled navigation route; and In step S302, the vehicle 120a is controlled to move into the assigned parking space according to the instruction.

With embodiments of the present disclosure, a vehicle can be controlled to park at a predetermined location based on trip information of the vehicle as well as other vehicles nearby. As a result, the likelihood that the vehicle under control blocking other vehicles (e.g., in a parking area, or on a road) can be minimized. Both an operation of a parking area, as well as traffic flow, can be improved as a result.

As an illustrative example, the computer system 110 may control individual vehicles to park at a predetermined set of parking spaces in a parking area based on a chronological order of the scheduled departure times of these vehicles, which can be the times these vehicles are scheduled to leave their parking spaces. Such an arrangement can reduce the likelihood of a vehicle being blocked by another parked vehicle on its way out of the parking area.

As another illustrative example, the computer system 110 may also determine, based on a scheduled departure route to be taken by a vehicle on its way out of the parking area, that vehicle is going to be blocked by another parked vehicle. Based on this determination, the computer system 110 may move the blocking vehicle to allow the blocked vehicle to leave. In a case where the blocking vehicle is parked on a route of a moving vehicle, the computer system 110 may also move the blocking vehicle to give way to the moving vehicle. In both cases, the likelihood of a parked vehicle blocking another vehicle (either parked or moving) can also be reduced as well.

Figure 4:
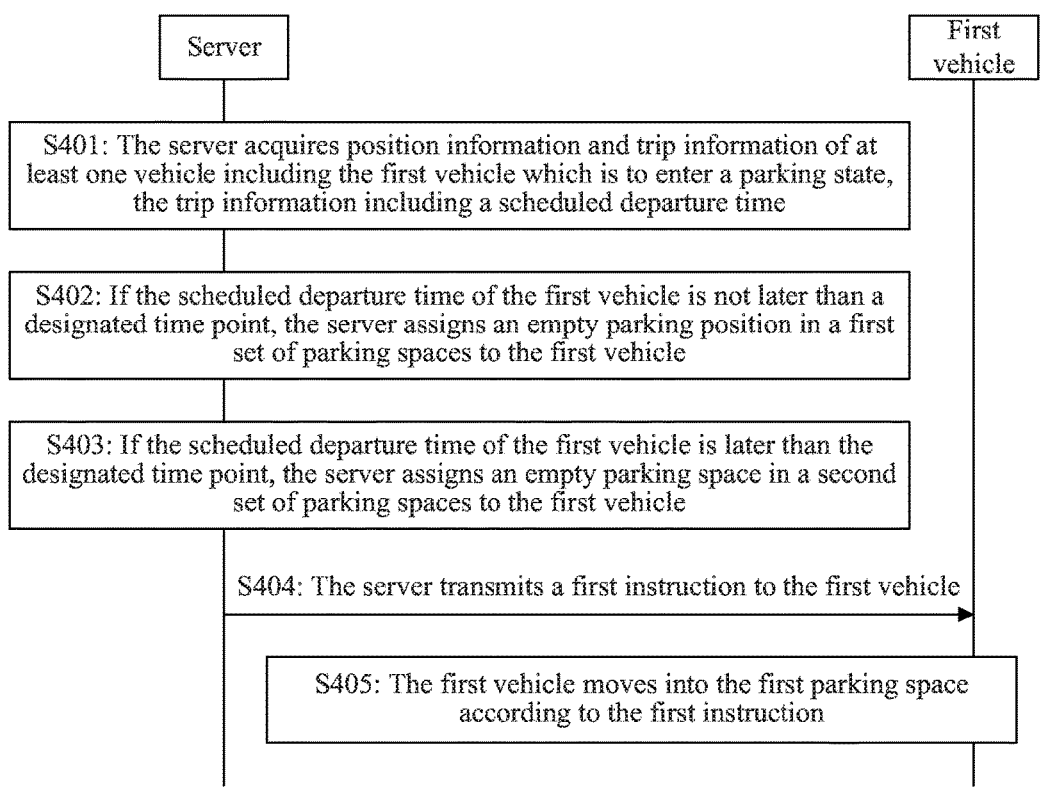
FIG. 4 is a flow chart illustrating an exemplary vehicle control method according to embodiments of the present disclosure.

FIG. 4 is a flow chart illustrating an exemplary vehicle control method 400 according to embodiments of the present disclosure. The method 400 may be performed by the vehicle control system 100 of FIG. 1 to, for example, control individual vehicles to park at a predetermined set of parking spaces based on a chronological order of their scheduled departure times, as discussed above. In some embodiments, the vehicle control method 400 may comprise the following steps S401-S405.

In step 5401, a computer system (e.g., the computer system 110) acquires position information and trip information of at least one vehicle including a first vehicle (e.g., the vehicle 120a of FIG. 1) which is to enter a parking state. The trip information may include a scheduled departure time for the first vehicle to move away from a certain location (e.g., a parking lot).

Optionally, the at least one vehicle may include all vehicles within the predetermined area or within a predetermined distance from the first vehicle. In some embodiments, the at least one vehicle may also include certain vehicles within the predetermined distance that also meet a predetermined condition. The predetermined condition may include, for example, a vehicle not being scheduled by the computer system to visit a certain location, or not being scheduled by the computer system at all.

In some embodiments, the computer system may receive real-time position information of the at least one vehicle from, for example, a satellite positioning module, a wireless positioning module, or other positioning module built in the vehicle. In addition, the computer system may also receive trip information of the vehicle from a control system of the vehicle. The trip information may include information of a scheduled trip for the vehicle, which includes a scheduled departure time for the vehicle to move away from a certain location. The trip information may be set in the vehicle, or received from a user terminal of the vehicle owner/driver in advance.

Optionally, the trip information may also include other information, such as a destination for the trip, and a navigation route to the destination.

In step S402, if the computer system determines that the scheduled departure time of the first vehicle is not later than a designated time point, the computer system may assign to the first vehicle a vacant parking space in a first set of parking spaces.

The designated time point may be a fixed time point set by the computer system in advance. For example, the designated time point may be fixed to 12:00 at noon. Alternatively, it may be a time point calculated and updated in real time by the computer system based on the current time. For example, the designated time point may be a time point 6 hours after a current time. If the current time is 8:00 AM, then the designated time point will be 2:00 PM.

In step S403, if the computer system determines that the scheduled departure time of the first vehicle is later than the designated time point, the computer system may assign a vacant parking space in a second set of parking spaces to the first vehicle.

In some embodiments, the first set of parking spaces may include a parking space that is positioned on a departure route from at least one parking space in the second set of parking spaces.

In some embodiments, the computer system may manage all parking spaces in an area. Some of the parking spaces may be close to one another. Some of the parking spaces may also be positioned on the departure routes from some other parking spaces. The computer system may divide the parking spaces into at least first and second sets of parking spaces based on positional relations among the parking spaces. For example, the first set of parking spaces may be associated with departure routes that pass a few or no other parking spaces. On the other hand, the second set of parking spaces may be associated with departure routes that pass many other parking spaces. Moreover, typically the first set of parking spaces includes parking spaces which can block the departure routes associated with the some of the parking spaces in the second set of parking spaces.

When the computer system determines a parking space for the first vehicle, the computer system may determine to choose the parking space from the first or second sets of parking spaces based on the scheduled departure time of the first vehicle, which can be set in advance. For example, if the scheduled departure time is before a certain time point (e.g., before 12:00 at noon), the computer system may assign a vacant parking space from the first set of parking spaces to the first vehicle, which allows the vehicle to leave the parking area more quickly (since the first set of parking spaces may be associated with departure routes that pass a few or no other parking spaces). But if the scheduled departure time of the first vehicle is after that certain time point (e.g., after 12:00 at noon), the computer system may assign, to the first vehicle, a vacant parking space from the second set of parking spaces, so that the first vehicle leaving late will not block the departure routes of other vehicles leaving earlier.

Figure 5:
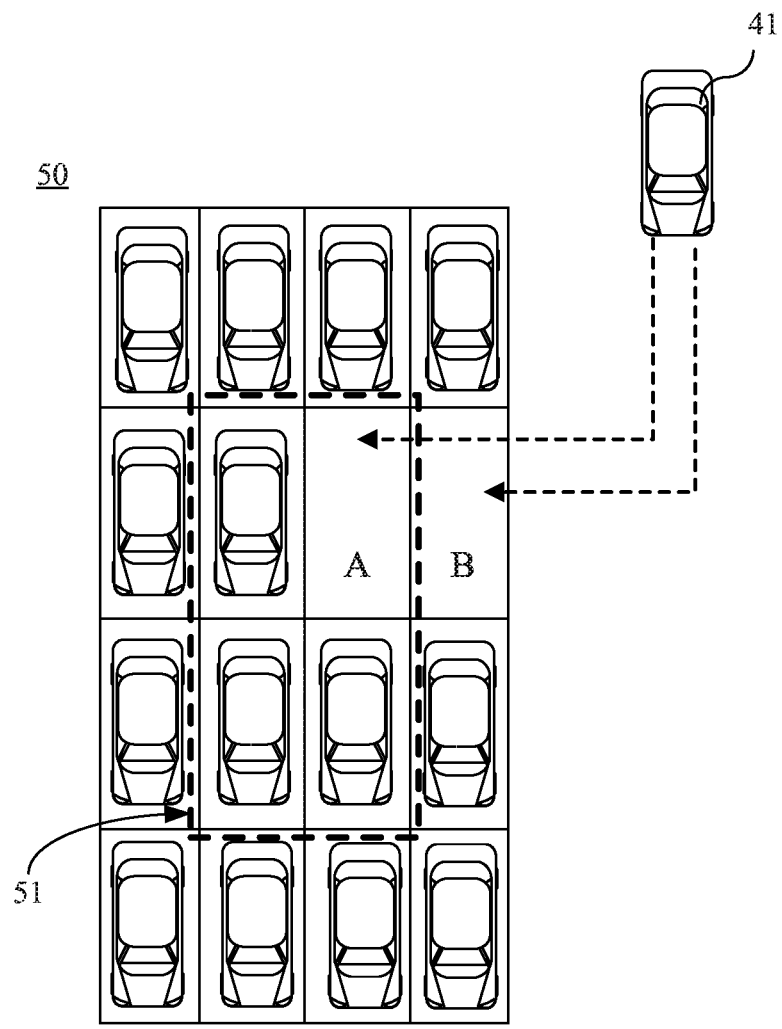
FIGS. 5-6 are schematic diagrams illustrating exemplary parking spaces assignment methods provided by embodiments of the present disclosure.

Reference is now made to FIG. 5, which illustrates an exemplary parking spaces assignment method provided by embodiments of the present disclosure. As shown in FIG. 5, there are 16 parking spaces in a parking area 50. The four parking spaces 51 in the middle may be designated as the second set of parking spaces, and the rest of the parking spaces surrounding the parking spaces 51 may be designated as the first set of parking spaces. Each of the first set of parking spaces, when occupied by a vehicle, can block the departure routes associated with at least one of the second set of parking spaces.

When a vehicle 41 enters a waiting state, the computer system can acquire the scheduled departure time of vehicle 41, and determine which parking space to assign to the vehicle 41 based on the relationship between the scheduled departure time and a designated time point. As an illustrative example, assuming the designated time point is 12:00 AM, if the scheduled departure time of the vehicle 41 is 9:30 AM, which is earlier than the designated time point, the computer system may assign space A in the first set of parking spaces to the vehicle 41. On the other hand, if the scheduled departure time of the vehicle 41 is 17:30 PM, which is later than the designated time point, the computer system may assign position B in the second set of parking spaces to the vehicle 41.

With such arrangements, a vehicle having a relatively later scheduled departure time can be assigned to a parking space in the middle of parking area 50, and a vehicle having a relatively earlier booked departure time can be scheduled to a parking space at an outer side of parking area 50. By the time the vehicle with later scheduled departure time are to leave the middle of parking area 50, they are less likely to be blocked off by vehicles parked at the outer side of parking area 50, since those vehicles are likely to have left by that time. As a result, the operation of the parking area can become more efficient, and the parking spaces can also be utilized more efficiently.

Referring back to FIG. 4, in step S404, the computer system transmits a first instruction that includes the information about the assigned parking space to the first vehicle. The computer system may transmit the first instruction to the first vehicle through a wireless network connection between the computer system and the first vehicle.

In step S405, the first vehicle is controlled to move into the assigned parking space according to the first instruction.

Optionally, the first vehicle can be controlled by an automatic driving system to move into the assigned parking space, after the wireless communication module of the first vehicle receives the instruction from the computer system. As an illustrative example, the automatic driving system may automatically determine a navigation route from a current position of the first vehicle to the assigned parking space, and control the first vehicle to move into the assigned parking space following the navigation route. As another illustrative example, the computer system may also determine a navigation route from the first vehicle to the assigned parking space based on the location of the assigned parking space, and the location of the first vehicle. The computer system may then include information about the navigation route, as well as the assigned parking space, in the first instruction transmitted to the first vehicle. The automatic driving system of the first vehicle can then control the first vehicle to move into the assigned parking space according to the navigation route information.

In some embodiments, in a case where the computer system assigns a vacant parking space in the first set of parking spaces, the computer system may also determine whether the assigned parking space blocks the only route available for accessing a vacant parking space in the second set of parking spaces. In that case, the computer system may assign a buffering parking space not positioned on a route between the first and second set of parking spaces, and transmit a second instruction to cause the first vehicle to move into the buffering parking space. After the computer system detects that the empty parking space in the second set of parking spaces has been occupied by another vehicle, the computer system can then transmit the first instruction to cause the first vehicle to move into the assigned parking space.

Figure 6:
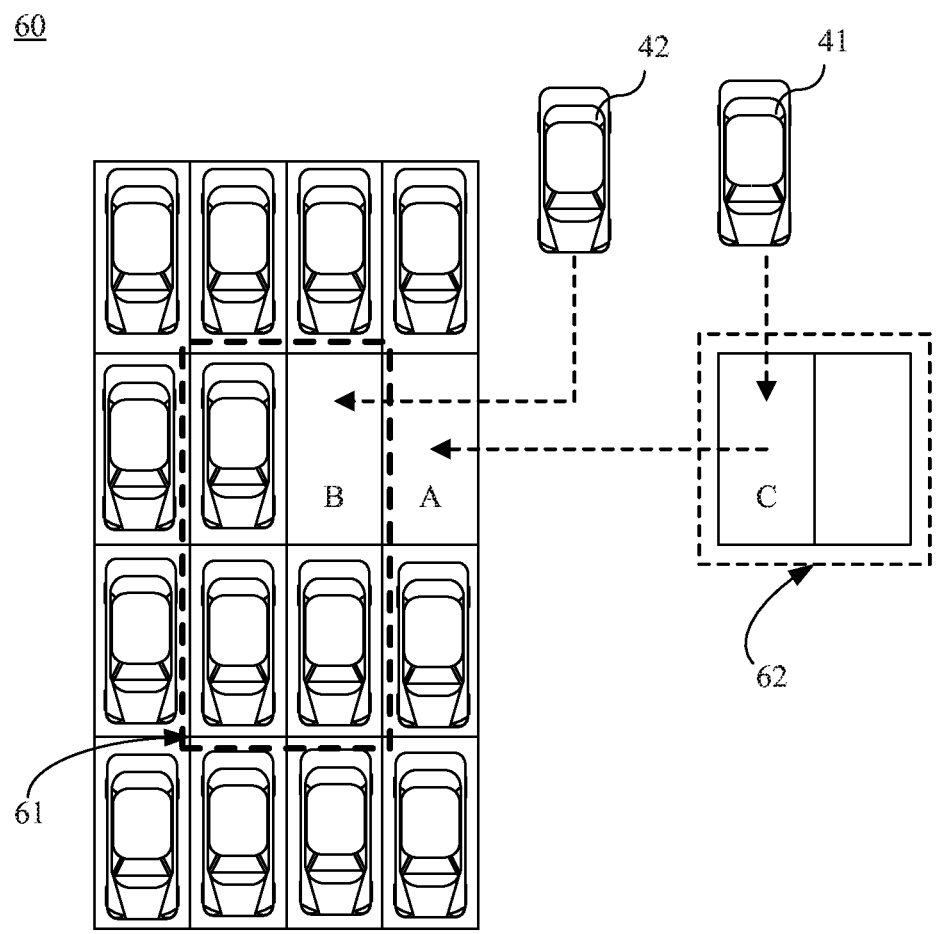

Reference is now made to FIG. 6, which illustrates an exemplary parking spaces assignment method provided by embodiments of the present disclosure. As shown in FIG. 6, a parking area 60 is divided into a main parking area on the left and a buffer parking area on the right. The main parking area on the left has majority of the parking spaces. For example, as shown in FIG. 6, there are 16 parking spaces in the main parking area. Among the 16 parking spaces, there are four parking spaces 61 that are designated the second set of parking spaces, and the remaining 12 parking spaces are designated the first set of parking spaces. The buffering parking area on the right includes parking spaces 62.

Both vehicles 41 and 42 are to be parked in the parking area 60. The vehicle 41 enters a waiting state earlier than the vehicle 42. The computer system acquires the scheduled departure time for the vehicle 41 as 9:30 AM, and determines to assign parking space A to the vehicle 41 based on the scheduled departure time. At this time, parking space B is not yet occupied, and the computer system detects that the parking space A is along the only route available for accessing the parking space B. If the vehicle 41 is parked at the parking space A, other vehicles that come later will not be able to move into the parking space B until vehicle 41 leaves. In this case, the computer system may first determine a currently available parking space in the right buffering parking area (e.g., the parking space C), and may instruct the vehicle 41 to move into the parking space C first. The computer system then acquires the scheduled departure time of the vehicle 42 as 17:30 PM, and based on this information, assigns the parking space B to the vehicle 42, and instructs the vehicle 42 to move into the parking space B. After detecting that the vehicle 42 has moved into the parking space B, the computer system then instructs the vehicle 41 to move into the parking space A.

With such arrangements, a vehicle having a relatively later scheduled departure time can be assigned to a parking space in the middle of parking area 60, and a vehicle having a relatively earlier scheduled departure time can be assigned to a parking space at an outer side of parking area 60. By the time the vehicle with later scheduled departure time are to leave their parking spaces in the middle of parking area 60, they are less likely to be blocked by vehicles parked at the outer side of parking area 60, since those vehicles are likely to have left by that time. Meanwhile, a buffering parking area is also provided for temporarily parking a vehicle that is assigned a parking space that blocks off other parking spaces. The buffering parking area also allows a vehicle, with an earlier scheduled departure time, to move into the assigned parking space after the blocked parking spaces have been occupied by other vehicles with later scheduled departure time. This further reduces the likelihood that a vehicle with earlier scheduled departure time being blocked off by other vehicles with later scheduled departure times. As a result, the operation of the parking area can become more efficient, and the parking spaces can also be utilized more efficiently.

Figure 7:
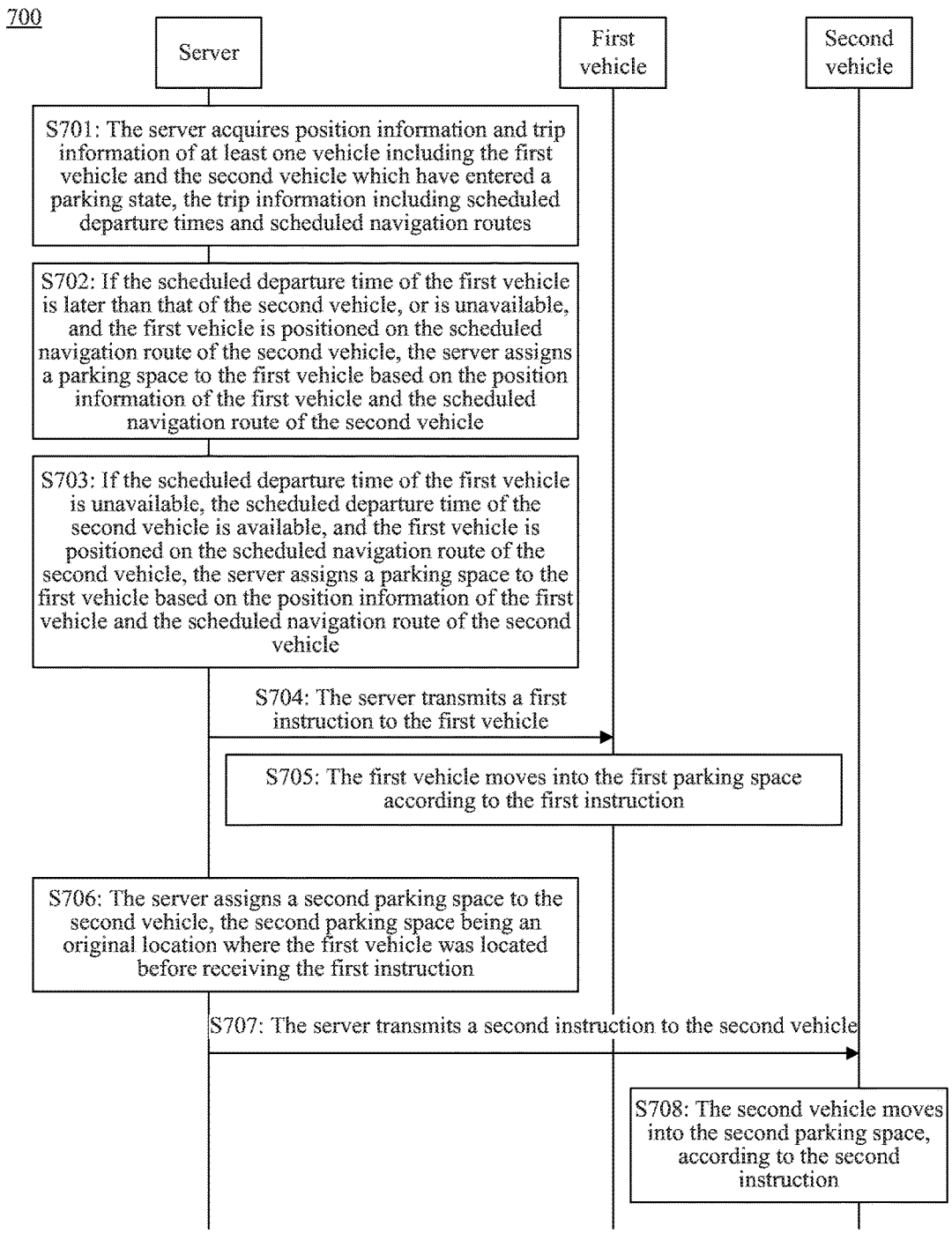
FIG. 7 a flow chart illustrating an exemplary vehicle control method according to embodiments of the present disclosure.

FIG. 7 is a flow chart showing an exemplary vehicle control method 700 consistent with embodiments of the present disclosure. The method 700 may be performed by the vehicle control system 100 of FIG. 1 to, for example, control a parked vehicle to move away to allow another parked vehicle to vacate its parking space, as discussed above. In some embodiments, the vehicle control method 700 may comprise the following steps S701-S708.

In step S701, a computer system (e.g., the computer system 110 of FIG. 1) acquires position information and trip information of at least one vehicle including a first vehicle (e.g., the vehicle 120a of FIG. 1) and a second vehicle (e.g., the vehicle 120b of FIG. 1) which have entered a parking state, the trip information including scheduled departure times and scheduled navigation routes. In some embodiments, the acquisition of position information and the trip information in step S701 is similar to step S401 of the vehicle control method 400 as described above, the details of which are not repeated here.

In some embodiments, the at least one vehicle includes at least two vehicles (e.g., a first vehicle and a second vehicle) which have entered the parking state. The computer system acquires the position information and the trip information of each of the first and second vehicles. The trip information may also include information about a scheduled navigation route as well as a scheduled departure time. The scheduled navigation route may be a navigation route for a vehicle to move to a specific destination or depart from a specific parking space.

In some embodiments, in a case where the predetermined navigation route is a navigation route for moving to a specific destination, the navigation route may be pre-set by a vehicle owner/driver using, for example, a user terminal. Alternatively, the vehicle owner/driver may also pre-set a destination, and the computer system may determine a navigation route based on the pre-set destination and the position information of the vehicle. In a case where the navigation route is for departing from a specific parking space, the navigation route may also be determined by the computer system based on the position information of the vehicle, as well as the surrounding environment information. In some embodiments, the computer system may attempt to acquire the trip information of the vehicle regardless of whether the vehicle owner sets a predetermined departure time or a predetermined navigation route. If those information are not available (e.g., because vehicle owner did not set the departure time or navigation route), the computer system may receive null departure time or navigation route information, and determines that those information are not available.

In step S702, The computer system determines that either scheduled departure time of the first vehicle is later than that of the second vehicle, or not available, and that the first vehicle is positioned on the predetermined navigation route of the second vehicle. Based on these determinations, the computer system may assign a first parking space to the first vehicle based on the position information of the first vehicle and the scheduled navigation route of the second vehicle.

In step S703, if the computer system determines that the scheduled departure time of the first vehicle is not available, but the scheduled departure time of the second vehicle is available, and the first vehicle is positioned on the scheduled navigation route of the second vehicle, the computer system may also assign a first parking space to the first vehicle based on the position information of the first vehicle and the scheduled navigation route of the second vehicle.

In some embodiments, the assigned first parking space to the first vehicle can be out of the predetermined navigation route of the second vehicle.

In some embodiments, when the computer system acquires the trip information of the second vehicle including the scheduled navigation route of the second vehicle, the computer system may determine whether the first vehicle is positioned on the scheduled navigation route of the second vehicle. If the first vehicle is determined to be on the scheduled navigation route of the second vehicle, the computer system further acquires the scheduled departure times of the first and second vehicles from their trip information. If the computer system determines that the scheduled departure time of the first vehicle is not available, but the scheduled departure time of the second vehicle is available, the computer system may determine that the owner/driver of the first vehicle have not set the scheduled departure time of the vehicle. Based on this determination, the computer system may estimate that a departure time of the first vehicle is to be later than that of the second vehicle, and assign a first parking space to the first vehicle that is not positioned on the scheduled navigation route of the second vehicle, to reduce the likelihood that the second vehicle is blocked by the parked first vehicle.

On the other hand, if both of the scheduled departure times of the first and the second vehicles are available, the computer system may determine whether the scheduled departure time of the first vehicle is later than that of the second vehicle. If the scheduled departure time of the first vehicle is later than that of the second vehicle, the computer system may also assign a first parking space to the first vehicle that is not positioned on the predetermined navigation route of the second vehicle, to reduce the likelihood that the second vehicle is blocked by the parked first vehicle.

In step S704, the computer system transmits a first instruction to the first vehicle including the assigned first parking space information. The instruction can be transmitted to the first vehicle through a wireless network connection between the computer system and the first vehicle.

Optionally, the computer system may also transmit the first instruction to the first vehicle at a predetermined time point before the scheduled departure time of the second vehicle, if the scheduled departure time of the first vehicle is not available. For example, the computer system may determine that, if the first vehicle departs before the scheduled departure time of the second vehicle, the first vehicle can be parked in other parking spaces, including parking spaces positioned on the predetermined navigation route of the second vehicle. In that case, the first vehicle needs not be moved to the assigned first parking space (which is not on the predetermined navigation route of the second vehicle) until a predetermined time point (e.g., five minutes) before the scheduled departure time of the second vehicle. On the other hand, if the scheduled departure time of the first vehicle is available, the computer system may either transmit the first instruction immediately after generating the first instruction, or at the aforementioned predetermined time point before the scheduled departure time of the second vehicle.

In step S705, the first vehicle is controlled to move into the assigned first parking space according to the first instruction, similar to step S404 of the method 400.

In step S706, if the assigned first parking space for the first vehicle is currently occupied by the second vehicle, the computer system may determine a second parking space for the second vehicle, the second parking space being occupied by the first vehicle before receiving the first instruction.

In step S707, the computer system transmits a second instruction to the second vehicle including the second parking space information.

The following example is provided to illustrate an operation of the method 700. Assuming that the first and second vehicles are parked very close to each other, and the first vehicle is parked in front of the second vehicle. As a result, the second vehicle is prevented from leaving its parking space. In this case, the computer system may schedule the first and second vehicles to exchange their parking spaces, to allow the second vehicle to leave. Meanwhile, the parking space exchange also allows the first vehicle to move to a nearby parking space that is nearby (the parking space currently occupied by the second vehicle), which allows the owner to locate the first vehicle later even after the vehicle was moved by the computer system.

In step S708, the second vehicle is controlled to move into the second parking space according to the second instruction. For example, the automatic driving system of the second vehicle may control the second vehicle to move into the second parking space according to the second instruction.

The computer system may also assign a temporary parking space for the exchange of parking spaces between the first and second vehicles. For example, the computer system may assign a temporary parking space from a vacant parking space. The vacant parking space can be out of a route to be taken by the second vehicle when moving into the second parking space (before being vacated by the first vehicle). By coordinating the transmission of the first and second instructions, the computer system may first control the first vehicle to vacate the second parking space and move into the temporary parking space, and then control the second vehicle to move into the second parking space vacated by the first vehicle. Finally, the computer system can control the first vehicle to move from the temporary parking space to the first parking space.

Figure 8:
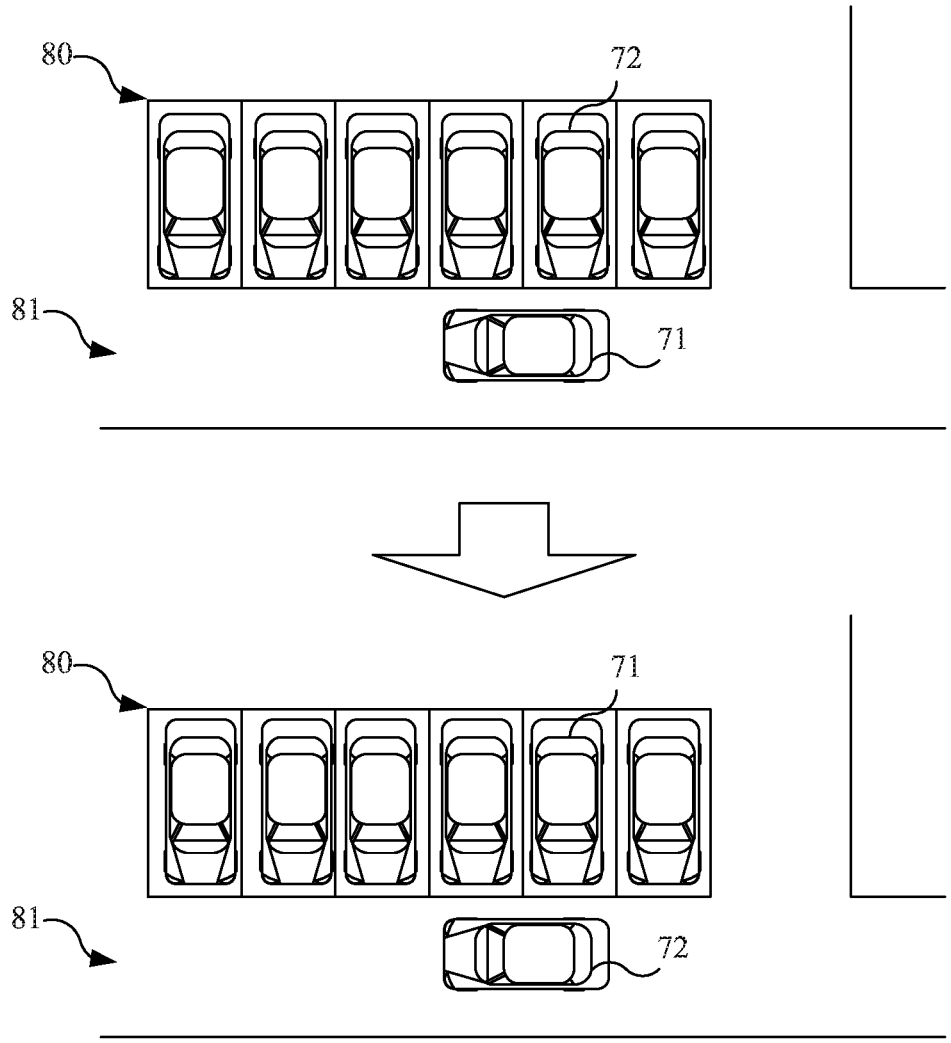
FIGS. 8-9 are schematic diagrams illustrating exemplary parking spaces exchange methods provided by embodiments of the present disclosure.

Reference is now made to FIG. 8, which illustrates a scenario for applying the exemplary parking spaces exchange method provided by embodiments of the present disclosure. As shown in FIG. 8, a parking area 80 is close to a road 81. A vehicle 71 and a vehicle 72 are parked, respectively, on the road 81 and at the parking area 80. The vehicle 71 blocks the departure route of the vehicle 72 from the parking area 80. After acquiring position information and trip information of the vehicles 71 and 72, the computer system determines that the vehicle 71 blocks the departure route of the vehicle 72, and compares the scheduled departure times of the vehicles 71 and 72.

If the computer system determines that the scheduled departure time of the vehicle 71 is later than that of the vehicle 72, or that the scheduled departure time of the vehicle 71 is not available but the scheduled departure time of the vehicle 72 is available, the computer system may transmit instructions to the vehicles 71 and 72 at a predetermined time point (e.g., five minutes) before the scheduled departure time of the vehicle 72, to cause the vehicles 71 and 72 to exchange their parking spaces.

Figure 9:
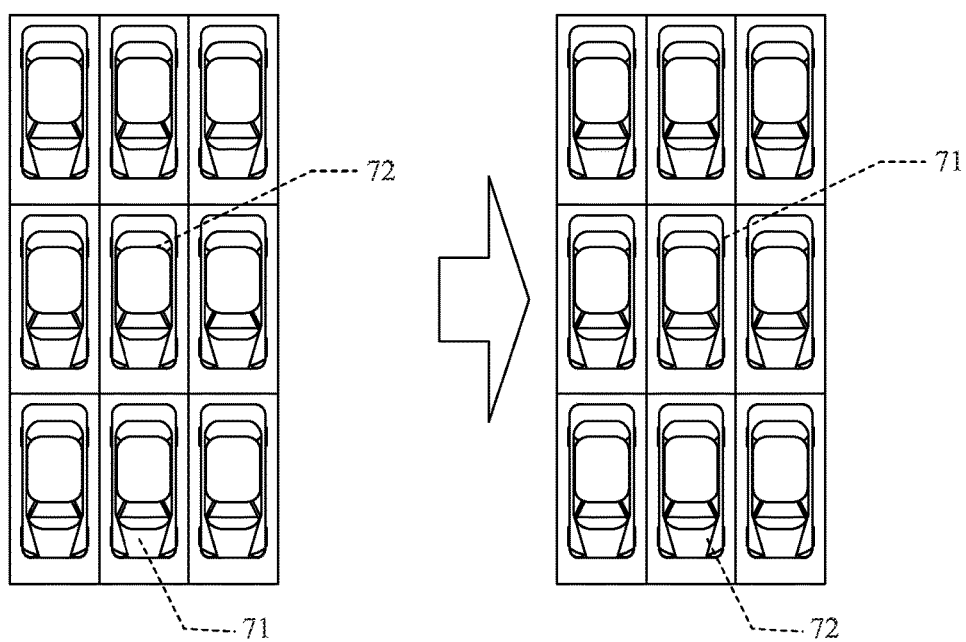

Reference is now made to FIG. 9, which illustrates an exemplary method for exchanging parking spaces provided by embodiments of the present disclosure. As shown in FIG. 9, a parking area 900 includes nine parking spaces arranged in a 3×3 array. A vehicle 72 is parked at a parking space in the middle of the parking area 900, and a vehicle 71 is parked at a parking space in front of where the vehicle 72 is parked. The vehicle 71 blocks the departure route of the vehicle 72. After acquiring position information and trip information of the vehicles 71 and 72, the computer system determines that the vehicle 71 blocks the departure route of the vehicle 72, and compares the scheduled departure times of the vehicles 71 and 72. If the computer system determines that scheduled departure time of the vehicle 71 is later than that of the vehicle 72, or if the scheduled departure time of the vehicle 71 is not available but the scheduled departure time of the vehicle 72 is available, the computer system may transmit instructions to the vehicles 71 and 72 immediately, or at a predetermined time point (e.g., five minutes) before the scheduled departure time of the vehicle 72, to cause the vehicles 71 and 72 to exchange their parking spaces.

With embodiments of the present disclosure, a computer system may determine, based on position information, scheduled departure times, and scheduled navigation routes of at least one vehicle, that a first parked vehicle may block a second parked vehicle. Based on this determination, the computer system may transmit instructions to cause the first vehicle to move out before the scheduled departure times of the second vehicle. As a result, the operation of the parking area can become more efficient, and the parking spaces can also be utilized more efficiently.

Figure 10:
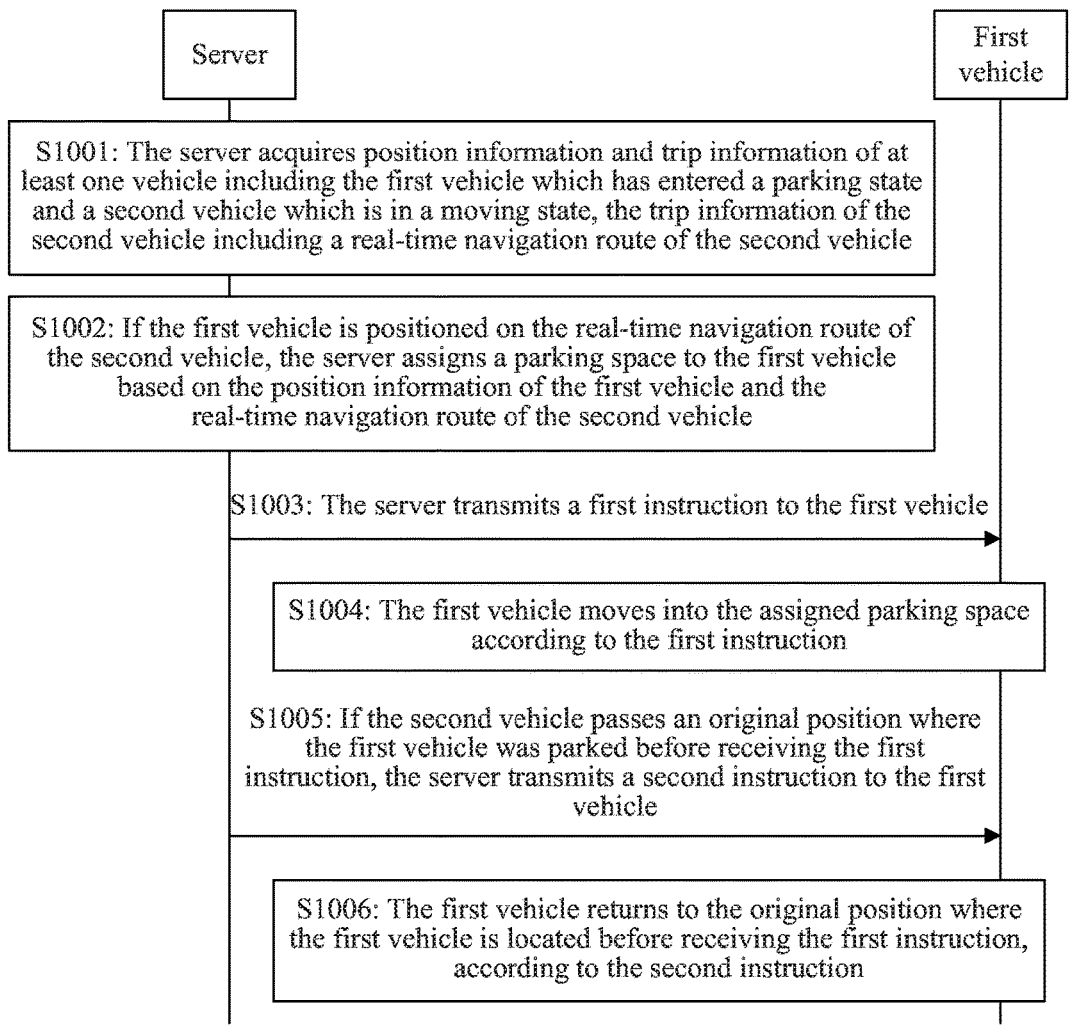
FIG. 10 a flow chart illustrating an exemplary vehicle control method according to embodiments of the present disclosures.

FIG. 10 a flow chart illustrating a vehicle control method 1000 according to embodiments of the present disclosure. The method 1000 may be performed by the vehicle control system 100 of FIG. 1 to, for example, move a parked vehicle that blocks a moving vehicle to give way to the moving vehicle, as discussed above. In some embodiments, the vehicle control method 1000 comprises the following steps S1001-S1006.

In step S1001, a computer system acquires position information and trip information of at least one vehicle including a first vehicle and a second vehicle. The first vehicle has entered a parking state and is parked at a certain location, while the second vehicle is in a moving state. The trip information of the second vehicle may include a real-time navigation route of the second vehicle. In some embodiments, the acquisition of position information and the trip information in step S1001 is similar to step S401 of the vehicle control method 400 as described above, the details of which is not repeated here. Because the first vehicle is in the parking state, the trip information of the first vehicle may include both a scheduled departure time at which the first vehicle is scheduled to leave its current position, and a predetermined navigation route of the first vehicle. On the other hand, because the second vehicle is in the moving state, the trip information of the second vehicle may include a real-time navigation route currently taken by the second vehicle when moving.

In step S1002, if the computer system determines that the first vehicle is positioned on the real-time navigation route of the second vehicle, the computer system assigns a parking space to the first vehicle based on the position information of the first vehicle and the real-time navigation route of the second vehicle. The assigned parking space can be out of the real-time navigation route of the second vehicle, to avoid the first vehicle blocking the second vehicle.

In some embodiments, if the computer system determines that the trip information of the first vehicle includes the scheduled departure time of the first vehicle, the computer system may also determine the time at which the second vehicle is to arrive at the first vehicle's current position. The computer system further determines, based on the position information of the first and second vehicles and the real-time navigation route of the second vehicle, the time at which the second vehicle will arrive at the first vehicle's current position, and whether the arrival time is earlier than the scheduled departure time of the first vehicle. If the computer system determines that second vehicle arrives at that location before the first vehicle leaves, the computer system may assign a parking space to the first vehicle based on the position information of the first vehicle and the real-time navigation route of the second vehicle, so that the first vehicle can move out of its current position which blocks the movement of the second vehicle. In some embodiments, if the trip information of the first vehicle does not include the scheduled departure time information, the computer system may also determine that the first vehicle will likely remain in its current position by the time the second vehicle arrives. The computer system may also assign a parking space to the first vehicle accordingly.

In some embodiments, if the computer system determines that the first vehicle may have left its current position by the time the second vehicle arrives, the computer system may determine that the first vehicle needs not move from its current position. The determination can be based on, for example, the scheduled departure time when the first vehicle is scheduled to move away from its current position. The determination can also be based on the estimated position of the second vehicle according to the real-time route information. For example, before performing the above step S1002, the computer system may determine whether a distance between the first and second vehicles is smaller than a preset distance threshold, and wait until the distance drops below the threshold before performing the step S1002.

In step S1003, the computer system transmits a first instruction to the first vehicle including the assigned parking space information. The first instruction can be transmitted to the first vehicle through a wireless network connection between the computer system and the first vehicle.

In step S1004, the first vehicle is controlled to move into the assigned parking space according to the first instruction, in a similar manner as step S404 of the method 400, the details of which are not repeated here.

In step S1005, the computer system determines that the second vehicle has passed the original location where the first vehicle was parked before it moves according to the first instruction. The computer system then transmits a second instruction to the first vehicle to return to the original location.

In step S1006, the first vehicle returns to the original location according to the second instruction, to allow the owner/driver of the first vehicle to retrieve the first vehicle more easily. In some embodiments, the automatic driving system of the first vehicle may automatically control the first vehicle to return to its original location, according to the second instruction.

Figure 11:
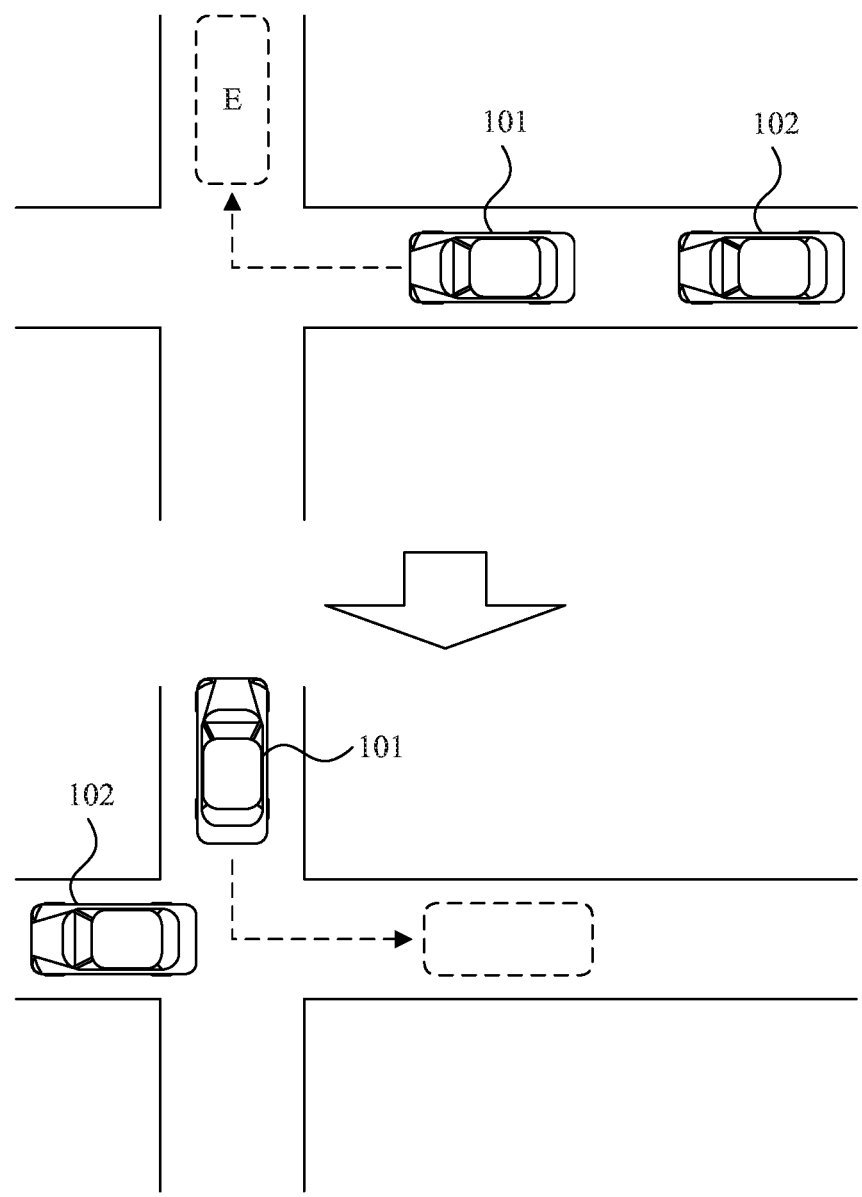
FIG. 11 is a schematic diagram illustrating a vehicle moving operation according to an exemplary vehicle control method provided by embodiments of the present disclosure.

Reference is now to FIG. 11, which illustrates a vehicle moving operation according to the method 1000 of FIG. 10. As shown in FIG. 11, a vehicle 101 is parked in the middle of a road. After the computer system detects that the vehicle 101 is on the real-time navigation route of a vehicle 102, the computer system determines a parking space E, which is out of the real-time navigation route of the vehicle 102, for the vehicle 101. The computer system then transmits the first instruction to the vehicle 101. The automatic driving system of the vehicle 101 controls the vehicle 101 to move into the parking space E. After the vehicle 102 passes, the computer system transmits the second instruction to the vehicle 101. Then, the automatic driving system of the vehicle 101 controls the vehicle 101 to return to its original position.

In some embodiments, the first and second vehicles may also directly perform information exchange and position scheduling therebetween. For example, the automatic driving system of the first vehicle may receive a give-way request sent by the second vehicle (e.g., when the first vehicle is determined to block the movement of the second vehicle). The automatic driving system of the first vehicle may then search for an available parking space within a preset range which is out of the real-time navigation route of the second vehicle. After the available parking space is found, the automatic driving system of the first vehicle may control the first vehicle to move into the available parking space. In some embodiments, the detection of the give-way request can be via short range wireless communications, acoustic and optical signals, etc. Optionally, after determining that the second vehicle has passed the original position where the first vehicle is located before receiving the give-way request, the first vehicle may also be controlled to return to the original position.

Referring to the illustrative example of FIG. 11, if the vehicle 102 determines that it is blocked by the vehicle 101, it may transmit a give-way request to the vehicle 101 via short range wireless communications or other predetermined methods, such as flashing lights or honking according to a predetermined pattern (e.g., repeated flashing or honking five times successively, for example). After detecting the give-way request from the vehicle 102, the vehicle 101 may automatically search an available parking space within a preset surrounding range. The search can be performed by, for example, analyzing images of the surrounding captured by cameras mounted above the vehicle 101. After finding the available parking space, the vehicle 101 is then controlled (e.g., by an automatic driving system) to move to the parking space. After the vehicle 102 passes, the vehicle 101 can be controlled to return to its original position.

With embodiments of the present disclosure, after determining that a first vehicle in the parking state is on the real-time navigation route of the second vehicle, the first vehicle can be controlled to move to a parking space to make way for the second vehicle. With such arrangements, traffic flows can be improved.

The followings describe apparatus embodiments of this disclosure, which may be used to perform the method embodiments of this disclosure. For details not disclosed in the apparatus embodiments of this disclosure, reference can be made to the method embodiments of this disclosure.

Figure 12:
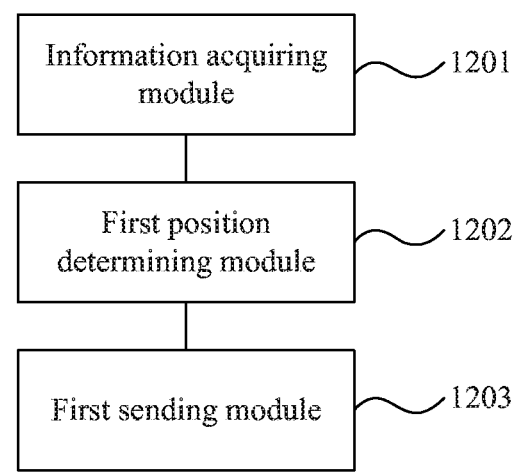
FIGS. 12-15 are schematic diagrams illustrating exemplary vehicle control apparatuses according to embodiments of the present disclosure.

FIG. 12 is a block diagram illustrating an exemplary vehicle control apparatus 1200 according to embodiments of the present disclosure. The vehicle control apparatus 1200 can be used for scheduling and assigning a parking space to a vehicle, and may be implemented as a part of the computer system 110 of FIG. 1 through software, hardware or a combination thereof. The apparatus 1200 may comprise: an information acquiring module 1201, a first position determining module 1202, and a first sending module 1203.

The information acquiring module 1201 is configured to acquire position information and trip information of at least one vehicle including a first vehicle which has entered or is to enter a parking state, the trip information including at least one of a real-time navigation route, a scheduled departure time and a scheduled navigation route. In some embodiments, the information acquiring module 1201 may be configured to perform at least a part of step S201 of FIG. 2.

The first position determining module 1202 is configured to assign a first parking space to the first vehicle based on the position information and the trip information of the at least one vehicle. In some embodiments, the information acquiring module 1201 may be configured to perform at least a part of step S202 of FIG. 2.

The first sending module 1203 is configured to transmit an instruction to the first vehicle to cause the first vehicle to move into the assigned first parking space. In some embodiments, the information acquiring module 1201 may be configured to perform at least a part of step S203 of FIG. 2.

Figure 13:
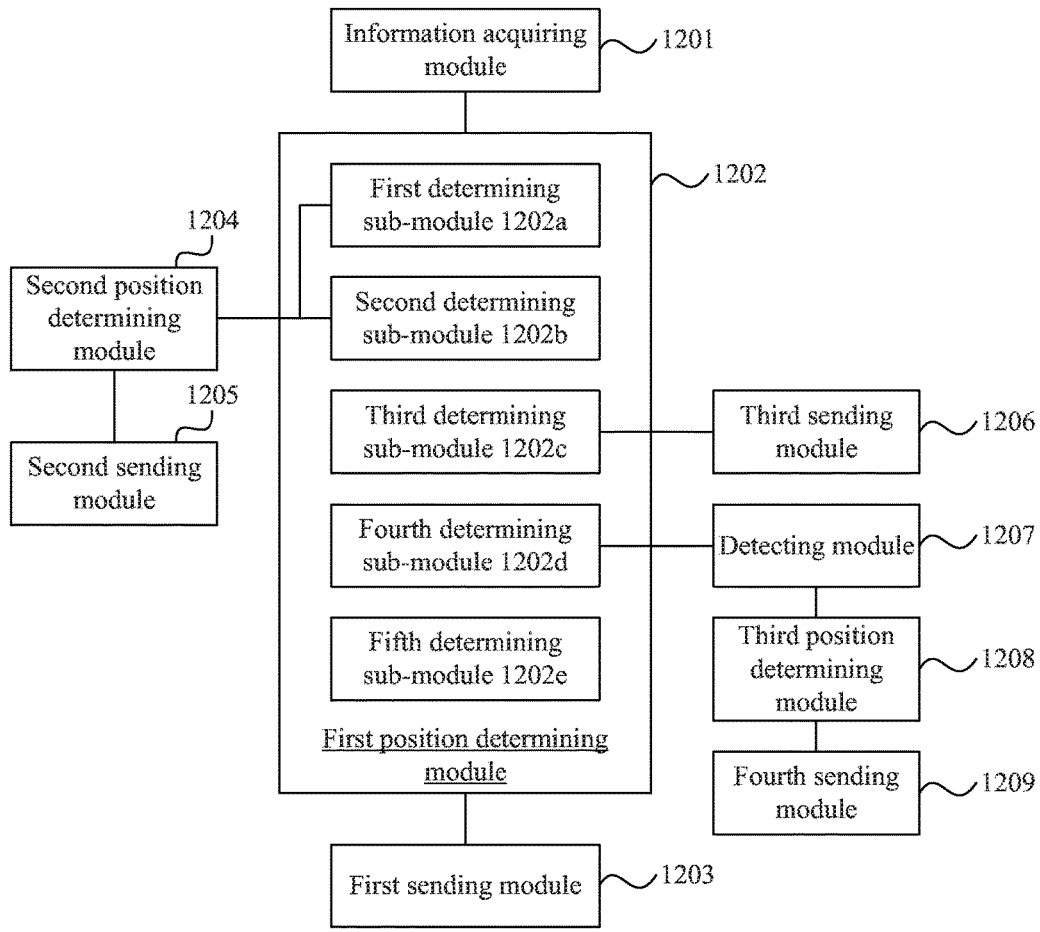

FIG. 13 is a block diagram illustrating an exemplary vehicle control apparatus 1300 according to another exemplary embodiment. The vehicle control apparatus 1300 can be used for scheduling and assigning a parking space to a vehicle, and may be implemented as a part of the computer system 110 of FIG. 1 through software, hardware or a combination thereof. The apparatus 1300 may comprise: an information acquiring module 1201, a first position determining module 1202 and a first sending module 1203.

The information acquiring module 1201 is configured to acquire position information and trip information of at least one vehicle including a first vehicle which has entered or is to enter a parking state, the trip information including at least one of a real-time navigation route, a scheduled departure time and a scheduled navigation route. In some embodiments, the information acquiring module 1201 is configured to perform at least a part of step S401 of FIG. 4.

The first position determining module 1202 is configured to determine a first parking space of the first vehicle based on the position information and the trip information of the at least one vehicle. The first position determining module 1202 may further comprise a first determining sub-module 1202a configured to, if the scheduled departure time of the first vehicle is determined to be later than that of the second vehicle, and the first vehicle is positioned on the scheduled navigation route of the second vehicle, assign a parking space that is out of the scheduled navigation route of the second vehicle. The first position determining module 1202 may also comprise a second determining sub-module 1202b configured to, if the scheduled departure time information of the first vehicle is unavailable but the scheduled departure time of the second vehicle is available, and the first vehicle is on the scheduled navigation route of the second vehicle, also assign a parking space that is out of the scheduled navigation route of the second vehicle. In some embodiments, the first position determining module 1202 is configured to perform at least a part of steps S701-S703 of FIG. 7.

The first sending module 1203 is configured to transmit a first instruction to the first vehicle to cause the first vehicle to move into the assigned parking space determined. In some embodiments, the first sending module 1203 is configured to perform at least a part of step S704 of FIG. 7.

Optionally, the apparatus 1300 may further comprises a second position determining module 1204 configured to assign a second parking space to the second vehicle, the second parking space being an original position where the first vehicle was located before receiving the first instruction, and a second sending module 1205 configured to transmit a second instruction to the second vehicle to cause the second vehicle to move into the second parking space. In some embodiments, the second position determining module 1204 and the second sending module 1205 are configured to perform, respectively, at least a part of steps S706 and S707 of FIG. 7.

Optionally, the first position determining module 1202 may further comprises a third determining sub-module 1202c configured to, if the first vehicle is positioned on the real-time navigation route of the second vehicle in a moving state, determine the first parking space of the first vehicle based on the position information of the first vehicle and the real-time navigation route of the second vehicle, the first parking space being out of the real-time navigation route of the second vehicle. In some embodiments, the third determining sub-module 1202c is configured to perform at least a part of step S1002 of FIG. 10.

The apparatus 1300 my further comprise a third sending module 1206 configured to, when the second vehicle passes an original position where the first vehicle was located before receiving the first instruction, transmit a third instruction to the first vehicle to cause the first vehicle to return to the original position. In some embodiments, the third sending module 1206 is configured to perform at least a part of step S1005 of FIG. 10.

Optionally, the first position determining module 1202 may further comprise a fourth determining sub-module 1202d configured to, when the scheduled departure time of the first vehicle is not later than a designated time point, assign a vacant parking space from a first set of parking spaces; and a fifth determining sub-module 1202e configured to, if the scheduled departure time of the first vehicle is later than the designated time point, assign a vacant parking space in a second set of parking spaces. The first set of parking space may include a parking space that is positioned on a departure route from at least one parking space in the second set of parking spaces. In some embodiments, the fourth determining sub-module 1202d and the fifth determining sub-module 1202e are configured to perform steps S402 and S403 of FIG. 4.

Optionally, the apparatus further comprises a detecting module 1207 configured to, before assigning a vacant parking space in the first set of parking spaces, determines that the assigned parking space blocks the only route available for accessing a vacant parking space in the second set of parking spaces, and assign a buffering parking space not positioned on a route between the first and second set of parking spaces (e.g., utilizing a third position determining module 1208). The apparatus may further comprise a fourth sending module 1209 configured to transmit a fourth instruction to the first vehicle to cause the first vehicle to move into the buffering parking space. The first sending module 1203 may also be configured to delay transmission of the first instruction to the first vehicle (to move into the assigned parking space) until the first vehicle moves into the buffering parking space.

Figure 14:
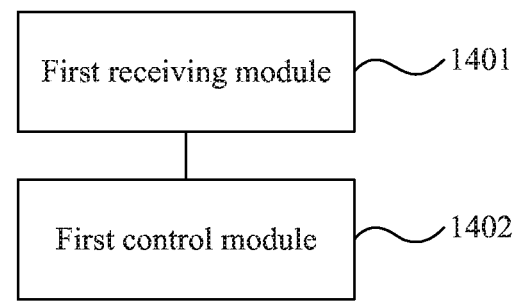

FIG. 14 is a block diagram illustrating an exemplary vehicle control apparatus 1400 according to embodiments of the present disclosure. The vehicle control apparatus can be implemented as a part of a first vehicle (e.g., the vehicle 120a of FIG. 1) through software, hardware or a combination thereof. The apparatus 1400 may comprise: a first receiving module 1401 and a first control module 1402.

The first receiving module 1401 is configured to receive, from a computer system, an instruction including information of an assigned parking space, the assigned parking space being determined by the computer system based on position information and trip information of at least one vehicle including a first vehicle which has entered or is to enter a parking state, the trip information including at least one of a real-time navigation route, a scheduled departure time, and a scheduled navigation route. In some embodiments, the first receiving module 1401 is configured to perform at least a part of step S301 of FIG. 3.

The first control module 1402 is configured to control the first vehicle to move into the assigned parking space according to the received first instruction. In some embodiments, the first control module 1402 is configured to perform at least a part of step S302 of FIG. 3.

Figure 15:
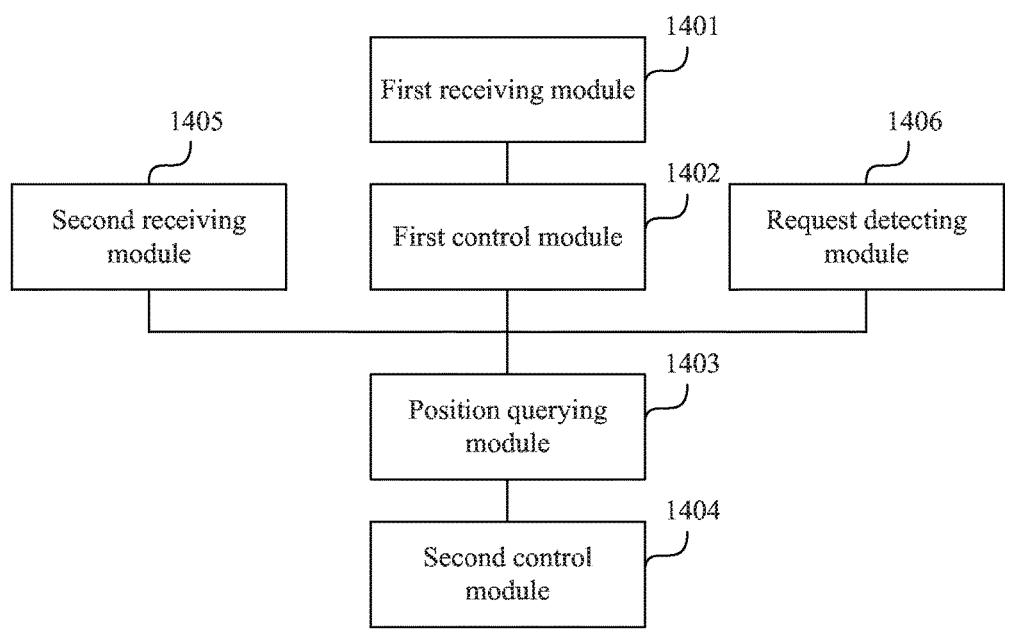

FIG. 15 is a block diagram illustrating a vehicle control apparatus 1500 according to yet another exemplary embodiment. The vehicle control apparatus 1500 may be implemented as a part of a first vehicle (e.g., the vehicle 120a of FIG. 1), which has entered or is to enter a parking state, through software, hardware or a combination thereof. In addition to the first receiving module 1401 and the first control module 1402 of FIG. 14, the apparatus 1500 further comprises: a position querying module 1403 configured to, when a give-way request sent by a second vehicle is detected, search for an available parking space within a preset range surrounding the first vehicle and that is out of the real-time navigation route of the second vehicle. The apparatus 1500 may further comprise a second control module 1404 configured to control the first vehicle to move into the parking space determined the position querying module 1403.

Optionally, the apparatus 1500 further comprises: a second receiving module 1405 configured to receive the give-way request from the second vehicle via short range wireless communications, before the position querying module 1403 searches for the available parking space. The apparatus 1500 may further comprise a request detecting module 1406 configured to detect the give-way request from the second vehicle via an acoustic and optical signal, before the position querying module 1403 searches for the available parking space.

Figure 16:
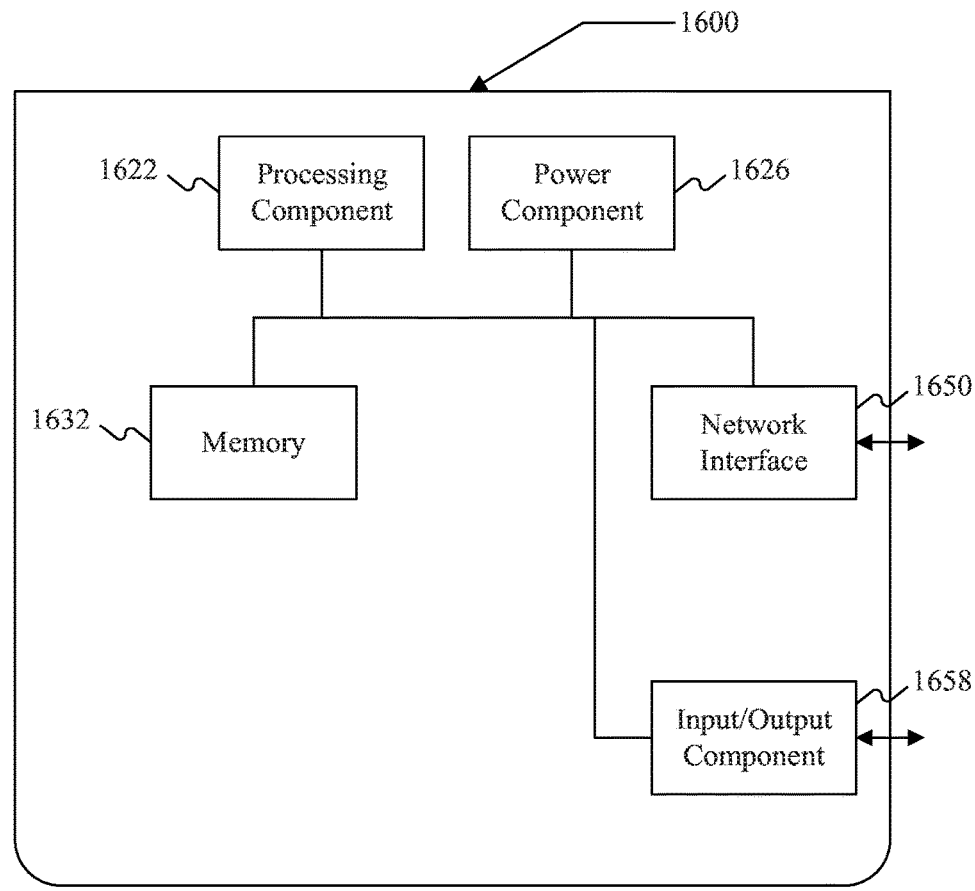
FIG. 16 illustrates an exemplary apparatus in which embodiments of the present disclosure can be implemented.

FIG. 16 is a block diagram illustrating an exemplary apparatus 1600 in which embodiments of the present disclosure can be implemented. For example, the apparatus 1600 may be provided as a computer system (e.g., the computer system 110 of FIG. 1), or an automatic driving system of a vehicle (e.g., the vehicle 120a of FIG. 1). Referring to FIG. 16, the apparatus 1600 comprises: a processing component 1622 which further comprises one or more processors, and memory resources represented by a memory 1632 for storing instructions executable by the processing component 1622, such as applications. The memory 1632 can include a non-transitory computer readable medium to store instructions that correspond to any of the modules and sub-modules of FIGS. 12-15. The instructions, when executed by the one or more processors of the processing component 1622, can also cause the one or more processors to perform the above described methods.

The apparatus 1600 may further comprise a power component 1626 configured to perform power supply management for the apparatus 1600, a wired or wireless network interface 1650 configured to connect the apparatus 1600 to a network and an input/output (I/O) component 1658. The apparatus 1600 may operate an operating system stored in the memory 1632, such as Windows Computer system™, Mac OS X™, Unix™, Linux™, FreeBSD™ or the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:
1. A vehicle control method, comprising:
acquiring, by a computer system, position information and trip information of at least one vehicle including a first vehicle which has entered or is to enter a parking state, the trip information including at least one of: a real-time navigation route, a scheduled departure time, or a scheduled navigation route;

determining, by the computer system, a first parking space for the first vehicle based on the position information and the trip information of the at least one vehicle; and transmitting, from the computer system, a first instruction including information about the first parking space to the first vehicle to cause the first vehicle to move into the first parking space, wherein the at least one vehicle includes a second vehicle, and wherein when the second vehicle is a moving second vehicle, the trip information of the moving second vehicle includes a real-time navigation route of the moving second vehicle, and the determining the first parking space for the first vehicle comprises:

responsive to determining that the first vehicle is positioned on the real-time navigation route of the moving second vehicle, determining a vacant parking space not positioned on the real-time navigation route of the moving second vehicle as the first parking space.

2. The method according to claim 1, wherein when the second vehicle is a parked second vehicle, the trip information includes the scheduled departure times of the first vehicle and the parked second vehicle and the scheduled navigation route of the parked second vehicle, and the determining the first parking space of the first vehicle based on the position information and the trip information of the at least one vehicle comprises:

responsive to determining that the scheduled departure time of the first vehicle is either unavailable or later than the scheduled departure time of the parked second vehicle, and that the first vehicle is positioned on the scheduled navigation route of the parked second vehicle, determining a vacant parking space that is not positioned on the scheduled navigation route of the parked second vehicle as the first parking space.

3. The method according to claim 2, wherein the first parking space is occupied by the parked second vehicle, and the method further comprises:

determining a second parking space of the parked second vehicle, the second parking space being an original position where the first vehicle was located before receiving the first instruction; and transmitting a second instruction to the parked second vehicle to cause the parked second vehicle to move into the second parking space.

4. The method according to claim 1, further comprising:

responsive to determining the moving second vehicle has passed an original position where the first vehicle was located before receiving the first instruction, transmitting a second instruction to the first vehicle to cause the first vehicle to return to the original position.

5. The method according to claim 1, wherein the determining the first parking space for the first vehicle comprises:

responsive to determining that the scheduled departure time of the first vehicle is not later than a designated time point, determining a vacant parking space in a first set of parking spaces as the first parking space; and responsive to determining that the scheduled departure time of the first vehicle is later than the designated time point, determining a vacant parking space in a second set of parking spaces as the first parking space;

wherein the first set of parking spaces includes a parking space that is positioned on a departure route from at least one parking space in the second set of parking spaces.

6. The method according to claim 5, wherein the second set of parking spaces includes a vacant parking space with a single accessible route, and the method further comprises:

responsive to determining that the first parking space blocks the single accessible route, determining a buffering parking space that is not positioned on a route between spaces in the first and second sets of parking spaces; and transmitting a second instruction to the first vehicle to cause the first vehicle to move into the buffering parking space, and wherein the first instruction is transmitted after determining that first vehicle has moved into the buffering parking space.

7. A vehicle control apparatus, comprising:

a processor; and a memory configured to store instructions executable by the processor, wherein the processor is configured to:

acquire position information and trip information of at least one vehicle including a first vehicle which has entered or is to enter a parking state, the trip information including at least one of: a real-time navigation route, a scheduled departure time, or a scheduled navigation route;

determine a first parking space for the first vehicle based on the position information and the trip information of the at least one vehicle; and transmit a first instruction including information about the first parking space to the first vehicle to cause the first vehicle to move into the first parking space, wherein the at least one vehicle includes a second vehicle, and wherein when the second vehicle is a moving second vehicle, the trip information of the moving second vehicle includes a real-time navigation route of the moving second vehicle, and in determining the first parking space for the first vehicle, the processor is further configured to:

responsive to determining that the first vehicle is positioned on the real-time navigation route of the moving second vehicle, determine a vacant parking space not positioned on the real-time navigation route of the moving second vehicle as the first parking space.

8. The apparatus of claim 7, wherein when the second vehicle is a parked second vehicle, the trip information includes the scheduled departure times of the first vehicle and the parked second vehicle and the scheduled navigation route of the parked second vehicle, and in determining the first parking space of the first vehicle based on the position information and the trip information of the at least one vehicle, the processor is further configured to:

responsive to determining that the scheduled departure time of the first vehicle is either unavailable or later than the scheduled departure time of the parked second vehicle, and that the first vehicle is positioned on the scheduled navigation route of the parked second vehicle, determine a vacant parking space that is not positioned on the scheduled navigation route of the parked second vehicle as the first parking space.

9. The apparatus of claim 8, wherein the first parking space is occupied by the parked second vehicle, and the processor is further configured to:

determine a second parking space of the parked second vehicle, the second parking space being an original position where the first vehicle was located before receiving the first instruction; and transmit a second instruction to the parked second vehicle to cause the parked second vehicle to move into the second parking space.

10. The apparatus of claim 7, wherein the processor is further configured to: responsive to determining the moving second vehicle has passed an original position where the first vehicle was located before receiving the first instruction, transmit a second instruction to the first vehicle to cause the first vehicle to return to the original position.

11. The apparatus of claim 7, wherein in determining the first parking space for the first vehicle, the processor is further configured to:
   responsive to determining that the scheduled departure time of the first vehicle is not later than a designated time point, determine a vacant parking space in a first set of parking spaces as the first parking space; and
   responsive to determining that the scheduled departure time of the first vehicle is later than the designated time point, determine a vacant parking space in a second set of parking spaces as the first parking space;
   wherein the first set of parking spaces includes a parking space that is positioned on a departure route from at least one parking space in the second set of parking spaces.

12. The apparatus of claim 11, wherein the second set of parking spaces includes a vacant parking space with a single accessible route, and the processor is further configured to:
   responsive to determining that the first parking space blocks the single accessible route, determine a buffering parking space that is not positioned on a route between spaces in the first and second sets of parking spaces; and
   transmit a second instruction to the first vehicle to cause the first vehicle to move into the buffering parking space, and
   wherein the first instruction is transmitted after determining that first vehicle has moved into the buffering parking space.

13. A non-transitory computer-readable storage medium having stored therein instructions that, when executed by a processor of a mobile terminal, cause the mobile terminal to perform a vehicle control method, the method comprising:
   acquiring position information and trip information of at least one vehicle including a first vehicle which has entered or is to enter a parking state, the trip information including at least one of: a real-time navigation route, a scheduled departure time, or a scheduled navigation route;
   determining a first parking space for the first vehicle based on the position information and the trip information of the at least one vehicle; and
   transmitting a first instruction including information about the first parking space to the first vehicle to cause the first vehicle to move into the first parking space,
   wherein the at least one vehicle further includes a second vehicle, and wherein when the second vehicle is a moving second vehicle, the trip information of the moving second vehicle includes a real-time navigation route of the moving second vehicle, and the determining the first parking space for the first vehicle comprises:
   responsive to determining that the first vehicle is positioned on the real-time navigation route of the moving second vehicle, determining a vacant parking space not positioned on the real-time navigation route of the moving second vehicle as the first parking space.

14. The storage medium of claim 13, wherein when the second vehicle is a parked second vehicle, the trip information includes the scheduled departure times of the first vehicle and the parked second vehicle and the scheduled navigation route of the parked second vehicle, and the determining the first parking space of the first vehicle based on the position information and the trip information of the at least one vehicle comprises:
   responsive to determining that the scheduled departure time of the first vehicle is either unavailable or later than the scheduled departure time of the parked second vehicle, and that the first vehicle is positioned on the scheduled navigation route of the parked second vehicle, determining a vacant parking space that is not positioned on the scheduled navigation route of the parked second vehicle as the first parking space.

15. The storage medium of claim 14, wherein the first parking space is occupied by the parked second vehicle, and the method further comprises:
   determining a second parking space of the parked second vehicle, the second parking space being an original position where the first vehicle was located before receiving the first instruction; and
   transmitting a second instruction to the parked second vehicle to cause the second vehicle to move into the second parking space.

16. The storage medium of claim 13, wherein the method further comprises: responsive to determining the moving second vehicle has passed an original position where the first vehicle was located before receiving the first instruction, transmitting a second instruction to the first vehicle to cause the first vehicle to return to the original position.

17. The storage medium of claim 13, wherein the determining the first parking space for the first vehicle comprises:
   responsive to determining that the scheduled departure time of the first vehicle is not later than a designated time point, determining a vacant parking space in a first set of parking spaces as the first parking space; and
   responsive to determining that the scheduled departure time of the first vehicle is later than the designated time point, determining a vacant parking space in a second set of parking spaces as the first parking space;
   wherein the first set of parking spaces includes a parking space that is positioned on a departure route from at least one parking space in the second set of parking spaces.

* * * * *